United States Patent [19]

Nakamura et al.

[11] Patent Number: 4,591,170
[45] Date of Patent: May 27, 1986

[54] CYLINDER HEAD GASKET HAVING METAL CORE WEB WITH HOOKS

[75] Inventors: Norihiko Nakamura, Mishima; Kenichi Nomura; Mamoru Yoshioka, both of Susono, all of Japan

[73] Assignee: Toyota Jidosha Kabushiki Kaisha, Toyota, Japan

[21] Appl. No.: 730,293

[22] Filed: May 3, 1985

[30] Foreign Application Priority Data

Jun. 25, 1984 [JP] Japan ............... 59-094895[U]

[51] Int. Cl.4 ............................................. F16J 15/12
[52] U.S. Cl. ................................. 277/235 B; 277/1; 277/234
[58] Field of Search .................. 277/235 B, 166, 233, 277/234, 235 R, 235 A, 1

[56] References Cited

U.S. PATENT DOCUMENTS

| 1,927,450 | 9/1933 | Balfe | 277/235 B X |
| 1,968,365 | 7/1934 | Bailey | 277/235 B X |
| 2,006,381 | 7/1935 | Bailey | 277/235 B X |
| 2,017,007 | 10/1935 | Liedle | 277/235 B X |
| 2,211,045 | 8/1940 | Balfe | 277/235 B X |
| 4,234,638 | 11/1980 | Yamazoe et al. | 277/235 B X |

FOREIGN PATENT DOCUMENTS

| 1219302 | 6/1966 | Fed. Rep. of Germany ... | 277/235 B |
| 2700662 | 7/1978 | Fed. Rep. of Germany ... | 277/235 B |
| 790016 | 9/1935 | France | 277/235 B |
| 56-127349 | 9/1981 | Japan . | |
| 2004602 | 4/1979 | United Kingdom ............ | 277/235 B |
| 396473 | 1/1974 | U.S.S.R. ............ | 277/235 B |

Primary Examiner—Robert S. Ward
Attorney, Agent, or Firm—Kenyon & Kenyon

[57] ABSTRACT

A cylinder head gasket arranged between a cylinder head and a cylinder block in an internal combustion engine. The cylinder head gasket has a core web of steel with hooks arranged between facing sides of a pair of gasket plates made of a heat resistant resilient material, such as asbestos or graphite. Grommet rings are fitted to edges of openings in the web and the gasket plates aligned corresponding to the respective cylinder bores. The web has regions adjacent to the inner periphery of the aligned openings and located substantially inside of the grommet member rings, the regions containing no hooks, or containing hooks having a reduced height.

2 Claims, 6 Drawing Figures

CYLINDER HEAD GASKET HAVING METAL CORE WEB WITH HOOKS

BACKGROUND OF THE INVENTION

1. Field of the Invention

The present invention relates to a cylinder head gasket in an internal combustion engine. More particularly, it relates to a cylinder head gasket having a construction wherein a core of a metal material in the form of a web contains hooks.

2. Description of the Related Art

In general, the construction of a cylinder head gasket for an internal combustion engine includes three layers comprising a core of metal material and gasket plates made of a heat-resistant sealing material, such as asbestos or graphite, and connected to respective sides of the metal core by applying pressure. The gasket also has, at the periphery of openings corresponding to cylinder bores of the engine, grommets fitted to the gasket plates in order to obtain a good sealing effect.

In Japanese Non-examined Utility Model Publication (Kokai) No. 56-127349, an improved cylinder head gasket is proposed wherein the steel web forming the material of the metal core is provided with a plurality of hooks arranged thereon to permit the steel web to be sealingly engaged with the heat resistant seal material. These hooks also serve to increase the rigidity of the cylinder head gasket as a whole. Therefore, the improved cylinder head gasket is particularly suitable for an engine having a high compression ratio and a large combustion pressure. However, large combustion pressures generate high compression loads, which are repeated in the cylinder head gasket located between the cylinder block and the cylinder head, and result in contact between the hooks and the grommets made from a metal material. This contact generates a concentration of stress points, which can lead to the generation of cracks in the grommet rings.

SUMMARY OF THE INVENTION

An object of the present invention is to provide a cylinder head gasket in which the hooks do not come into contact with the grommet rings.

According to the present invention, there is provided a cylinder head gasket adapted for arrangement between a cylinder head and a cylinder block in an internal combustion engine for sealing a combustion chamber formed between a recess in the cylinder head, cylinder bores in the cylinder block, and pistons arranged in the cylinder bores, the cylinder head gasket comprising: a pair of gasket plates made of a heat-resistant elastic material, and placed adjacent to the cylinder head and the cylinder block, respectively; a core web made of a metal material arranged between the face sides of the gasket plates, the gasket plates and the core web having openings aligned so that they correspond with the cylinder bore, and grommet rings having a substantially U-shaped cross-section fitted to the edges of the aligned openings of the gasket plates and the core web. The core web has a plurality of hooks, capable of contacting the gasket plates in such a manner that they engage therewith, arranged evenly along the entire area of both sides of the core web and facing the gasket plates, except in the area located adjacent to the inner periphery of the openings and substantially inside of the grommet members, so that the core web has no hooks in that area.

DESCRIPTION OF THE PREFERRED EMBODIMENTS

The preferred embodiments of the present invention will now be described with reference to the accompanying drawings.

Figure 1:
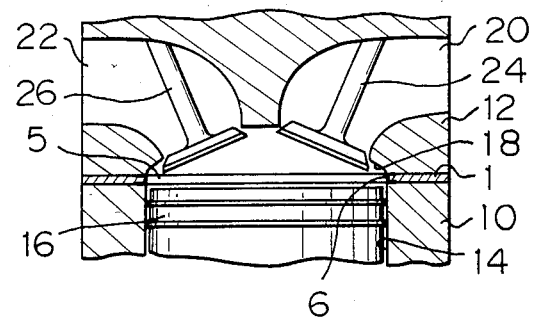
FIG. 1 is a cross-sectional view of an internal combustion engine provided with a cylinder head gasket according to the present invention.

In FIG. 1, reference numeral 1 denotes a cylinder head gasket arranged between a cylinder block 10 and a cylinder head 12. The gasket 1 has a plurality of openings 5 which are aligned with the corresponding cylinder bores 14 in the cylinder block, in which pistons 16 are slidably arranged. The openings 5 also are aligned with a recess 18 formed at the bottom of the cylinder head 12, so that combustion chambers are formed between the cylinder head gasket 1, cylinder head 12, cylinder block 10, and the pistons 16, to which combustion chambers intake ports 20 and exhaust ports 22 are opened via respective intake valves 24 and exhaust valves 26.

Figure 2:
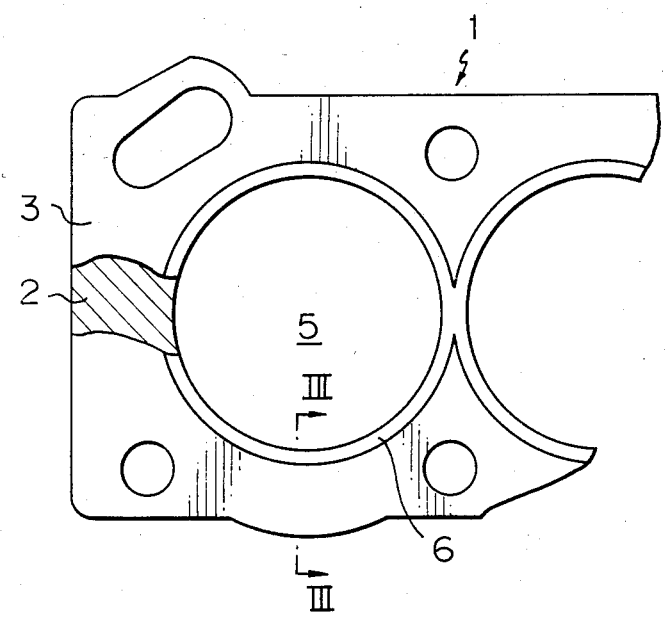
FIG. 2 is a partial plan view of the cylinder head gasket according to the present invention.
Figure 3:
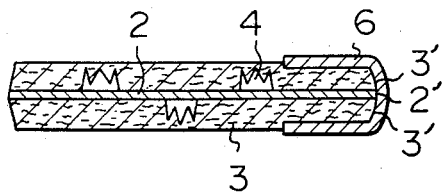
FIG. 3 is a view taken along line III—III in FIG. 2.
Figure 4A:
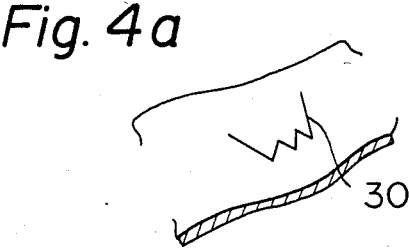
FIG. 4(a) is a perspective view illustrating an initial step in forming a hook in the web.
Figure 4B:
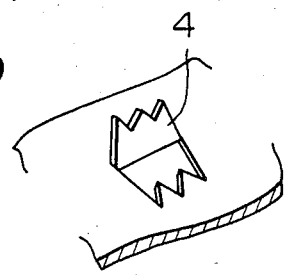
FIG. 4(b) is a perspective view showing a completed hook formed in the web.

As shown in FIG. 2, the cylinder head gasket 1 has a core made of metal material in the form of a planular steel web 2, to both sides of which gasket plates 3 made of a heat-resistant sealing material, such as asbestos or graphite, are connected by applying pressure thereon. As shown in FIG. 3, the core web 2 is provided with a plurality of pointed end hooks 4, which are made by pressing portions of the web 2 so that the hook portions 4 are projected out of the general surface of the web. It should be noted that the hooks 4 are equally distributed on both sides of the web 2. As shown in FIGS. 4(a) and 4(b), the hooks may be made, for example, by first slitting the web along predetermined profiles 30 as shown by 4(a), and then bending the portions formed by the profiles 30 as shown by 4(b), so as to define the hooks 4. The hooks 4 maintain the web 2 in close contact with the gasket plates 3, by engaging with the gasket plates 3 in such a manner that the hooks 4 penetrate into the gasket plates 3.

As shown in FIG. 3, the cylinder head gasket according to the present invention further is provided with grommet rings 6 having a substantially U-shaped cross-section which are fitted to the inner edges 2' and 3' of aligned openings 5 of the core 2 and the plates 3 so that the openings 5 corresponding to the respective cylinder bores 14 are formed inside the periphery of the grommet rings 6. The grommet rings 6 provide, when located between the cylinder block 10 and the cylinder head 12, resilient forces permitting the gasket to effectively seal the gap when compressed between the cylinder head 12 and cylinder block 10.

According to the first embodiment of the present invention, the core web 2 has areas in which the hooks 4 are not provided along the inner periphery of the openings 5 substantially located inside of the grommet rings 6, as seen in FIG. 3. Due to this arrangement, there is no possibility that the pointed ends of the hooks 4 will come in contact with the flange portions of the grommet rings 6 when the cylinder head gasket 1 is subjected to repeated compression force between the cylinder head and the cylinder block 10. As a result, the generation of any local concentration of stress in the grommet ring 6, which would otherwise take place, is prevented, and therefore, the generation of cracks in the grommet rings is also prevented.

Figure 5:
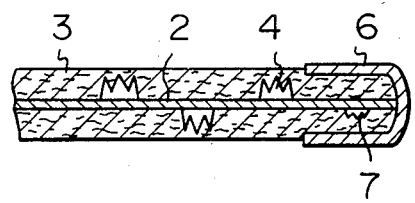
FIG. 5 is a view, similar to FIG. 3, of the second embodiment of the present invention.

In the second embodiment shown in FIG. 5, the core web 2 has hooks 7 also at the region adjacent to the inner periphery of the corresponding openings 5 located substantially inside the grommet rings 6. The heights of the hooks 7 located in this region are, however, lower than those of the hooks 4 located in the remaining regions. This lowered height of the hooks 7 may be obtained by forming the hooks 7 as explained with reference to FIGS. 4(a) and 4(b) along the entire area of the web, followed by pressing the hooks 7 along the region near the inner periphery of the opening 5 in such a manner that the heights of the hooks 7 at this region are decreased. Since the height of the hooks 7 located inside the grommet rings 6 is decreased, there is no possibility that the hooks will come into contact with the grommet rings 6. This second embodiment can simplify the process of making hooks, since the slitting shown in FIG. 4 can be effected along the entire area of the metal web without the need to precisely align the web as in the case of the first embodiment.

We claim:

1. A cylinder head gasket adapted for arrangement between a cylinder head and a cylinder block in an internal combustion engine for sealing a combustion chamber formed between a recess in the cylinder head, cylinder bores in the cylinder block, and pistons arranged in the cylinder bores, said cylinder head gasket comprising:
   a pair of gasket plates made of heat-resistant elastic material, and placed adjacent to the cylinder head and the cylinder block, respectively;
   a core web made of metal material arranged between the face sides of the gasket plates, said gasket plates and said core web having openings aligned to correspond with the cylinder bore; and
   grommet rings having a substantially U-shaped cross-section fitted in the edges of the aligned openings of said gasket plates and said core web;
   the core web having a plurality of first hooks capable of contacting the gasket plates in such a manner that the first hooks are engaged with said gasket plates and arranged evenly along the entire surface of both sides of the core web and facing the gasket plates except in the area located adjacent to the inner periphery of the openings and substantially inside of the grommet rings, in which area the core web has only second hooks having a reduced height as compared with the height of the first hooks, such that the second hooks are spaced away from contact with the grommet rings.

2. A method of producing a gasket adapted for arrangement between a cylinder head and a cylinder block in an internal combustion chamber formed between a recess in the cylinder head, cylinder bores in the cylinder block and pistons arranged in the cylinder bores, said method comprising steps of:
   providing a pair of gasket plates made of heat resistant material;
   providing a core member made of metal material, said gasket plates and said core member having openings aligned to correspond with the cylinder bores;
   forming on the core web a plurality of hooks of the same height;
   pressing regions of the web member along the periphery of the openings so that the height of the hooks at said regions along the periphery of the openings becomes less than the height of the hooks in the remaining areas;
   applying the pair of gasket plates to the partly pressed core web so that the core web is sandwiched between the plates with the hooks engaging the material of the gasket plates and the openings of the core web being aligned with the corresponding openings of the gasket plates;
   providing grommet rings having a substantially U-shaped cross-section; and
   fitting the grommet rings in the edges of the corresponding and aligned openings of the gaskets and the core web.

* * * * *